May 23, 1939.  W. J. MORRIS  2,159,598

VEHICLE SIGNALING SYSTEM

Original Filed Jan. 27, 1936   2 Sheets-Sheet 1

INVENTOR.
William J. Morris.
BY
ATTORNEY

May 23, 1939.　　　　W. J. MORRIS　　　　2,159,598

VEHICLE SIGNALING SYSTEM

Original Filed Jan. 27, 1936　　2 Sheets-Sheet 2

INVENTOR.
William J. Morris.
BY
ATTORNEY

Patented May 23, 1939

2,159,598

UNITED STATES PATENT OFFICE 2,159,598

VEHICLE SIGNALING SYSTEM

William J. Morris, La Salle, Ill., assignor, by mesne assignments, to General Time Instruments Corporation, New York, N. Y., a corporation of Delaware Application January 27, 1936, Serial No. 61,012
Renewed June 29, 1938

3 Claims. (Cl. 200—35)

My invention relates to vehicle signaling means and has for its object the production of a signaling means associated with vehicles such as automobiles whereby drivers in automobiles following other automobiles may be continually advised by signaling means associated with the automobiles ahead and actuated by the driver thereof, among other things, of which way the driver of the automobile ahead intends to turn when he reaches an intersecting street or when he intends to turn into the curb, or turn around between the intersecting streets.

The laws of many States now require the driver of the automobile ahead to signal to those following by extending his hand and forearm out of the automobile window. This is extremely impracticable especially in unreasonable weather and it is very difficult to see the extended hand and it is generally otherwise difficult to distinguish just what the driver really means to indicate because he must keep several different things in mind at this time so that it keeps the driver of the car following rather guessing as to just what the driver of the car ahead will actually do when the street intersection or any turning point is reached.

One of the objects of my invention is the production of such a signaling system that is absolutely positive when once operated by the driver and continues to clearly show or indicate the signal for a predetermined period of time and after said period of time is passed, it will shut off the signal without any further effort or thought on the driver's part, and will be ready for further operation by the driver when necessary. Other objects will be set forth in the specification below.

A further object of my invention is the production of a signaling means such that in case the driver erroneously signals the wrong indication he can instantly correct the signal by changing to the correct one, without in any way destroying the efficiency of the signaling means.

I accomplish the above mentioned objects by the means shown in the accompanying drawings in which.

In the drawings similar numerals represent the same parts throughout the several views.

Figure 1:
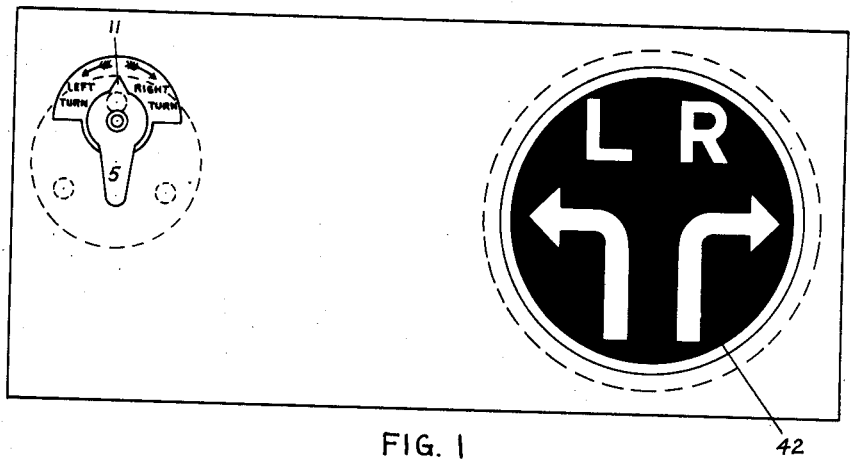
Fig. 1 is a diagrammatic front view of my system showing the signaling means and also the driver's operating lever.

In the drawings my signaling system is for convenience shown mounted on a member 1 which carries the signal actuating means 2, the electric battery 3 and the illuminated signaling means 4. The signaling actuating means 2 comprises a lever 5 rigidly mounted on shaft 6 by means of the screw 7, which shaft 6 is journaled in a bearing member 8 which has the elongated threaded end shown and is shaped as shown and which is mounted and secured in the frame member 1 by means of the nut 9 on the previously mentioned threaded end of bearing 8. Fastened between said nut 9 and the frame 1 is a plate 10 on which the indicating means for moving the lever 5 is inscribed. The upper part of lever 5 has a pointer 11 which is used in connection with the indicating data inscribed in said plate 10.

Figure 3:
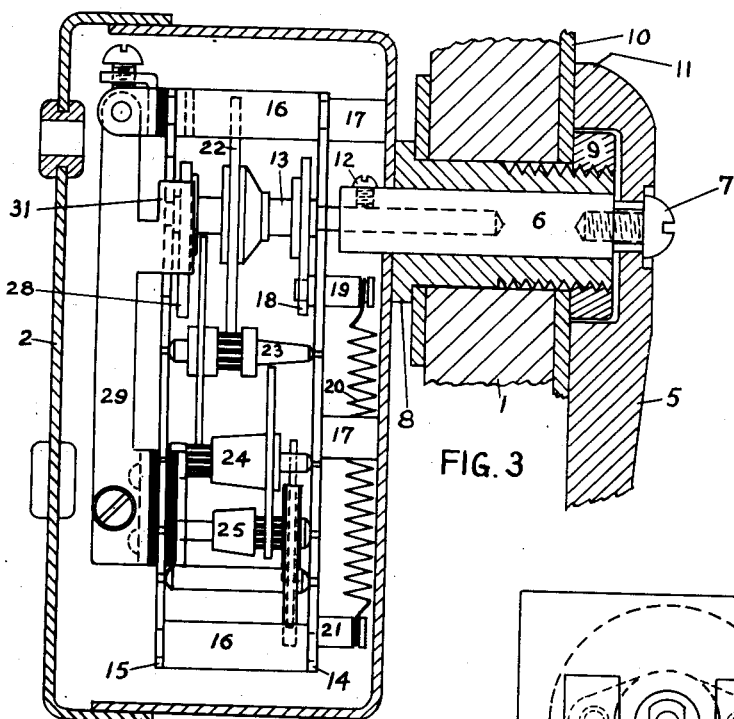
Fig. 3 is an enlarged vertical cross sectional view of Figure 2 along a line 3—3 viewed from the left.
Figure 4:
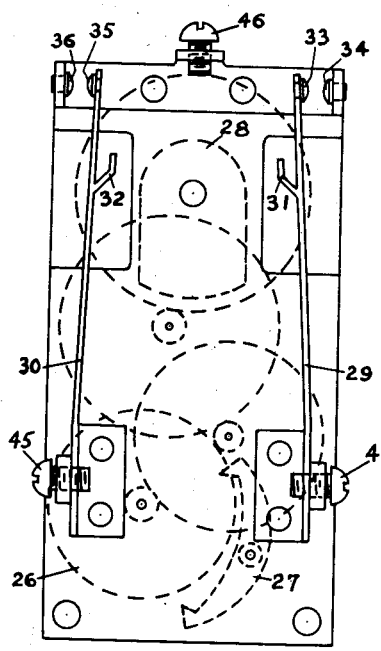
Fig. 4 is a rear view of the actuating movement showing the electrical contacts and their operation.
Figure 5:
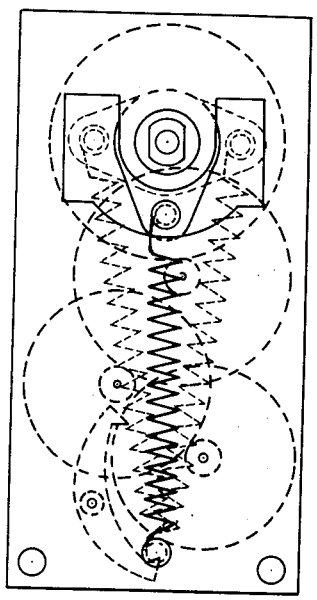
Fig. 5 is a front view of the actuating movement with the operating spring connected to the winding lever for same.

Connected to the shaft 6 by means of the screw 12 is the shaft 13 of the signal actuating movement which comprises a pair of movement plates 14 and 15 fastened together by means of the pillars 16 shown in which plates the shaft 13 is journaled. The actuating movement is fastened to the outer casing 2 by means of pillars 17 fastened to plate 14 which outer casing 2 is fastened to the flange on the left hand end of said bearing 8. Fastened on shaft 13 is a projecting member 18 which carries a pin 19 having the circular groove shown into which is fitted the upper loop of the movement driving spring 20 whose lower end also carries a loop which is mounted in the grooved part of the projection 21 fastened on plate 14, all as is shown in Figs. 3 and 5. When the lever 18 and spring 20 is in position indicated in Figure 3 and in the solid lines shown in Figure 5 so that the center of the pin 19 is in line with the center of said shaft 13 and the center of projection 21 the spring 20 is stretched enough to have considerable initial tension more than sufficient to drive the regulated or time movement means hereinafter described. In this position, shown in Figures 3 and 5 just described, it is evident that the spring 20 cannot possibly exert any turning movement to the shaft 13. In this position of the spring 20 the lever 5 is so positioned on the shaft 6 and shaft 6 so connected with shaft 13 such that the lever 5 will be in the central or non-indicating vertical position shown in Figure 1. As soon, however, as lever 5 is moved to bring its pointer 11 either to the right or left of the vertical line it will move the upper loop on pin 19 out of the center line of the center shaft 13 and the projection 21 putting additional tension in said spring 20 so that the lever 5 will be appropriately returned to its central or non-indicating position by said spring 20. Accordingly it is seen that lever 5 can be moved in either direction from its said center line putting additional tension in spring 20 and that it will always be returned thereto by the spring 20 whenever the lever 5 will be released from the manual means applied by the driver to move it from its said central position to an indicating position and thus release the power to actuate the movement now to be described.

Frictionally mounted on said shaft 13 is a gear wheel 22 which thus permits the lever 5 to be turned in either direction to further tension the spring 20, which on its return to its center position aforesaid by virtue of the previously mentioned frictional means causes the gear wheel 22 to rotate and thus to drive the associated pinions and gear wheels connecting 23, 24 and 25 therewith, as shown, and finally driving an escape wheel 26 whose teeth engage with a verge 27 which verge is journaled in the plates as shown and is of such shape and weight that it permits the power of the spring 20 to run down at a uniform rate whenever said spring is additionally tensioned by moving the lever 5 to an indicating position as previously above mentioned.

Mounted on and rigidly fastened to said shaft 13 is a cam member 28 which is preferably made of electrically insulated material, and is so positioned on said shaft 13 that it is in line with the lever 5 and being rigidly connected to shaft 13 as is lever 5, it always moves whenever lever 5 is moved. Mounted on said plate 15, but electrically isolated therefrom, is a resilient movable contact member 29 and a similar contact member 30 each of said resilient members having a projecting member 31 and 32 respectively, each of which projects into the path of said cam member 28 such when handle or lever 5 is moved so that the cam part 28 moves toward the resilient member 29 until the part 31 rides on the dwell proper of the cam. The movable contact part 33 will then be forced against its co-operating contact part 34 thereby closing the electric circuit mentioned below to be closed and to be again broken when the extended spring 20 returns to its central position of rest, as above described. Similarly the lever 5 is moved so that the cam part 28 moves toward the resilient member 30 until the projection 32 rides on the dwell proper of the cam 28, the movable contact part 35 on member 30 will be forced against the other stationary co-operating part 36 thereby closing another electric circuit separate from that closed by the contacts 33 and 34, previously above mentioned, the purpose of all of which will be further described below.

Figure 2:
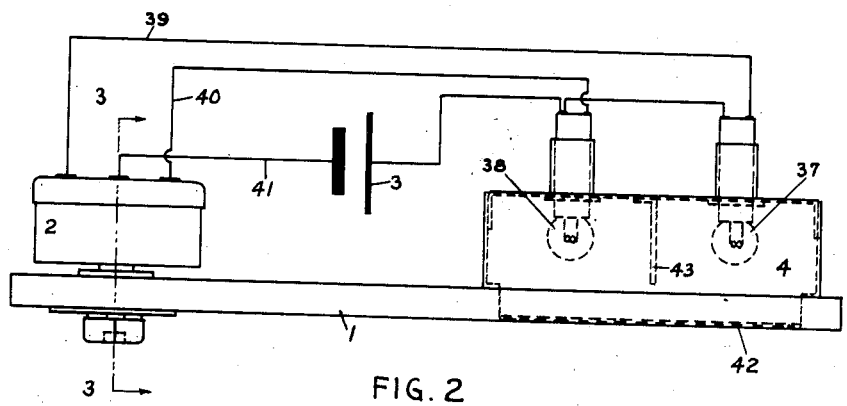
Fig. 2 is a top view of Fig. 1.

Each of the sets of contacts 33—34 and 35—36 is in circuit with an electrical light bulb 38 and 37 respectively as shown in Figure 2 since the wire 39 connects the light bulb 37 with the contacts 33—34 through the binding screw 44 and the wire 40 connects the light bulb 38 with the contacts 35—36 through the binding screw 45 and the wire 41 attached to movement on binding screw 46 and contact parts 34 and 36. Grounded thereon is the common return wire to the electric battery or source of current supply 3. As previously above mentioned the resilient members 29 and 30 which respectively carry the contacts 33 and 35 are insulated from the movement plates so that the contact parts 34 and 36 being electrically connected or grounded with the movement plates form an adequate ground for the return wire 41.

The light bulbs may be made of colored glass or suitably colored to give effective light for signaling purposes and adjacent to and in front of each of said light bulbs is placed a suitable screen 42 either transparent, non-transparent with indicating parts transparent or open or translucent in appropriate colors to make the signaling means easily visible either in daylight or in the dark, the partition 43 between the light bulbs 37 and 38 making each bulb when lighted operate as a separate unit for each signal to be indicated.

The signaling part just described can preferably be large and mounted somewhere at the rear of the driven car so that the signal will be readily seen by the car following. A similar small signaling means can be placed on the dash of the car or in front of the driver so that the driver can always see just what signal he has given and to see that the signaling means is operating in response to the operating lever.

It is evident from the above description that in operation with my signaling device the driver can turn the handle or lever 5 in either direction so that the signaling arrow and direction letter will show and when the lever 5 is released the signal intended to be given will continue to show and indicate until the handle or lever 5 with the spring 20 is again returned by the movement to the central or non-indicating position for the handle or lever 5 and the position of rest for spring 20, regardless of the direction the handle or lever 5 may be moved to indicate. Further, if the driver finds he indicated the direction wrongly he can instantly move the lever 5 to the opposite position to blot out the erroneous signal and indicate the correct signal and have the corrected signal show for the given period at which the actuating means is set to operate because the gear wheel 22 is frictionally mounted on the actuating shaft 13. It is further evident that the necessary current can be supplied by the regular automobile battery.

It will be seen that I have produced a signaling means which is absolutely positive in its indicating and automatic in bringing itself back to the non-indicating position within a predetermined time and one which is easily operated and which can instantly be corrected in case an error has been made by the driver and one which is simple and inexpensive to produce and one which cannot be damaged even with the roughest kind of handling.

It will be understood, of course, that while I have here shown one form of my device, I do not wish to limit myself to said form but desire to have it taken in a sense illustrative of any and all the forms that come fairly within the scope of the appended claims.

I claim:

1. In a device comprising a plurality of switching means, means for selectively operating one or the other of said switching means comprising a frame, a shaft journaled in said frame, a manually operated selective indicating means fastened on said shaft, an auxiliary fastening means on said shaft, a single resilient positioning means attached to said fastening means retaining said indicating means in its centrally disposed position, said single resilient positioning means constituting a means to rotate said shaft to a centrally disposed position whenever said indicating means moves said shaft from its said centrally disposed position, a rotatably mounted mechanical retarding means frictionally connected with said shaft, and an integral double acting cam rigidly mounted on said shaft adjacent to said switching means whereby movement of said indicating lever in one direction from said centrally disposed position will close one of said switching means and movement in the other direction therefrom will close the other switching means.

2. In a device comprising a plurality of switching means, means for selectively operating one or the other of said switching means comprising a frame, a shaft journaled in said frame, a manually operable selective indicating means fastened on said shaft for rotating said shaft in either direction from its centrally disposed position, a rotatably mounted mechanical retarding means frictionally connected with said shaft, a single resilient positioning means for retaining said shaft and indicating means in the centrally disposed position and for returning said shaft and indicating means to such position whenever said indicating means is released following a manual positioning thereof, and an integral double-acting cam rigidly mounted on said shaft adjacent to said switching means whereby movement of said indicating means in one direction from said centrally disposed position will close one of said switching means and movement in the other direction therefrom will close the other switching means.

3. In a switching mechanism, a frame, a shaft journaled in said frame, two sets of contacts mounted on said frame, a rotatably mounted retarding means frictionally connected with said shaft, a manual operable indicating means rigidly fastened to said shaft for rotating said shaft in either direction, a single resilient positioning means for retaining said shaft in a neutral position and for returning said shaft to such position when manually displaced therefrom, and a single double-acting cam for closing one or the other of said sets of contacts dependent upon the direction of rotation of said shaft from its neutral position.

WILLIAM J. MORRIS.